(No Model.)

J. N. GIRARD.
COMBINED TOOL.

No. 345,630. Patented July 13, 1886.

Witnesses
S. N. Piper.
R. B. Torrey

Inventor.
Joseph N. Girard.
by R. H. Eddy atty.

UNITED STATES PATENT OFFICE.

JOSEPH NAPOLEON GIRARD, OF IPSWICH, MASSACHUSETTS, ASSIGNOR, BY MESNE ASSIGNMENTS, TO SAID JOSEPH N. GIRARD AND ALFRED WALTER GIRARD, OF SAME PLACE.

COMBINED TOOL.

SPECIFICATION forming part of Letters Patent No. 345,630, dated July 13, 1886.

Application filed April 5, 1886. Serial No. 197,790. (No model.)

*To all whom it may concern:*

Be it known that I, JOSEPH NAPOLEON GIRARD, of Ipswich, in the county of Essex, of the Commonwealth of Massachusetts, have invented a new and useful Improvement in Combined Tools; and do I hereby declare the same to be described in the following specification and represented in the accompanying drawings, of which—

Figure 1:
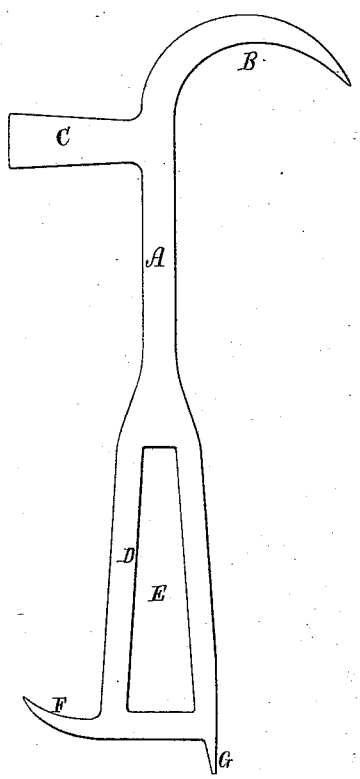
Figure 3:
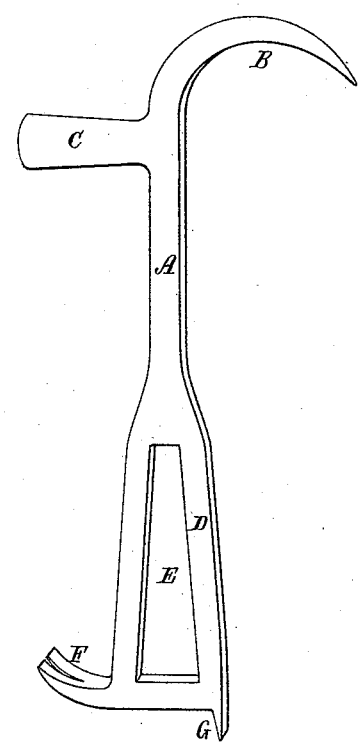
Figure 2:

Figure 1 is a side view, Fig. 2 a front edge view, and Fig. 3 a perspective view, of an implement of my invention, the nature of which is defined in the claim hereinafter presented.

In such drawings, A denotes a shank, terminating at its upper part in a hook, B, and a hammer-head, C, arranged as represented. The shank, at its lower part, has a flat handle, D, which, in shape, is trapezoidal, or approximately so, and has within it, lengthwise of it, a trapezoidal or tapering slot, E. There projects from one corner, at the lower end of the handle a hammer-claw, F, and from the other corner a wedge-shaped projection, G, all being arranged as represented.

This tool is designed particularly for the use of coachmen or stablemen, as with it the hoofs of a horse, when balled with ice or snow, can be picked with the hook; the shoes can be relieved from stones or other matters; the clinchers of the nails of the shoes may be turned down or broken off with the claw, and a nut of a carriage may be turned by the handle by inserting the nut in the slot E, such slot being tapering to enable it to be adjusted to grasp the nut. Furthermore, the projection G answers the purpose of a screw-driver. The slot in the handle is useful as a means of supporting the implement on a nail or hook projecting from a wall or partition.

I do not claim a tool having a flat tapering and slotted shank, a screw-driver at the lower end thereof, and a hammer-head and two claws at the opposite end, all as shown in the United States Patent No. 147,113; nor do I claim an implement consisting of a slotted and tapering handle, having at its larger end a claw, and at its lesser end a lid-lifter, reverse-hook, a tack-extractor and a can-opener, as represented in the United States Patent No. 171,487; nor do I claim a tool provided with a tapering and slotted handle, having at its lesser end a screw-driver, and provided at its larger end with a hammer-head and claw, and a hatchet-blade, all as represented in the United States Patent No. 172,277; nor do I claim a tool composed of a slotted handle, a claw at one end thereof, and a screw-driver, ice-pick, and hammer-head at the other end, all as represented in the United States Patent No. 180,521; nor do I claim an implement having at one end a stove-cover lifter, tack-drawer and hammer, and at the other a can-opener, and also having, at intermediate points, a cork-screw and a bail-hook, all as represented in the United States Patent No. 209,599.

My implement, though having a shank and a tapering and slotted handle thereto, has at the outer end of the shank the hook and hammer-head, and at the outer end of the handle the claw and screw-driver. The hook projects above and in rear of the hammer-head, whereby such hook is rendered capable of being used to advantage without interference of the hammer-head, and the latter without interference of the hook. By having the claw and screw-driver at the larger end of the handle, either can be used without interference from the other when the hand of a person is applied to the hammer-head or to the hook, or both, at the end of the shank.

My implement differs from either of the others above cited, in having the hook extend endwise from the shank and above and in rear of the hammer-head, and also in having at the larger end of the slotted handle, the screw-driver and the claw to extend therefrom, as represented. Therefore

I claim—

The improved combined tool constructed as described, consisting of the shank A, its flat and tapering handle D, provided with a longitudinally-tapering wrench, the hammer-head C and the hook B, arranged, as shown, at the outer end of the shank, and of the claw F and wedge-shaped projection or screw-driver G, extending from the larger end of the handle, all as set forth.

JOSEPH NAPOLEON GIRARD.

Witnesses:
CHARLES A. SAYWARD,
ALBERT P. JORDAN.